UNITED STATES PATENT OFFICE

WILLIAM L. OWEN, OF BATON ROUGE, LOUISIANA, ASSIGNOR, BY MESNE ASSIGNMENTS, TO THE CITIZENS OF THE UNITED STATES

PROCESS FOR THE MANUFACTURE OF ALCOHOL

No Drawing. Application filed December 21, 1927. Serial No. 241,735.

(GRANTED UNDER THE PROVISION OF THE ACT OF MARCH 3, 1883, 22 STAT. L. 625)

This application is made under act of March 3, 1883, chapter 143 (22 Stat. 625) and the invention herein described and claimed may be used by the Government of the United States or any of its officers or employees in the prosecution of the work for the Government, or by any other person in the United States, without payment to me of any royalty thereon.

My invention relates particularly to the production of alcohol from cane bagasse.

Cane bagasse, the by-product from the milling of sugar cane, contains sufficient residual sugars to yield from 5 to 9 gallons of alcohol per ton, if it is fermented with the efficiency that is obtained, for example, in the fermentation of the sugars in final molasses, or blackstrap.

I have found that fresh bagasse when added in proportions varying from 1-10% to a molasses wort at 17 Brix–20 Brix density, gave an increase of alcohol equivalent to from 1.5 to 4.5 gallons of alcohol per ton of bagasse. The addition of bagasse to a fermentation molasses wort accelerates the rate of fermentation and shortens the period required for its completion to one-third that ordinarily required. By the use of bagasse it is possible to ferment molasses worts of considerably higher density than would be possible without the use of this accelerant. When used on worts of 35 and 40 Brix density the addition of bagasse has given increases in yields of alcohol amounting to as much as 13 gallons per ton over that obtained without its use. Furthermore, the fermentation is approximately completed in 70 hours in the presence of bagasse, where, in its absence, the fermentation is usually only one-half completed in 120 hours.

The details of my process are as follows:

The yeast is developed as under ordinary conditions in a yeast apparatus containing molasses wort and added nutrients at a density of 20 Brix. When the density of the wort has been reduced to one-half of its original density as a result of the destruction of its fermentable sugar, the seed yeast is transferred as under ordinary distillery practice to an intermediate or seed vat, where it is mixed with sterile molasses wort of approximately the same density as that of the yeast apparatus. In this seed vat wort there is added approximately 5% of cane bagasse which is sterilized within the wort. The seed yeast is allowed to come in contact with the sterile bagasse before the main volume of the fresh wort is brought in contact with it. This procedure has been found to be quite necessary from my investigations, for to obtain best results the seed yeast should be absorbed into the cellular portion of the bagasse. The explanation of this is that one of the principal advantages of the bagasse is in maintaining the suspension of the yeast cells throughout the fluid, and in causing a more rapid liberation of $CO_2$ gas, which in high concentrations is inimical to the development of the yeast.

The seed yeast is allowed to develop in the seed vat in the presence of the bagasse as under ordinary conditions, i. e., for 8 to 10 hours, although this period will be found to be shorter than that required where no bagasse is added. After the density of the wort in the seed vat has been reduced by one-half indicating the ripeness of the seed for use, the contents of this vat are transferred to the main fermenters as under ordinary practice in distilleries. The usual rate of seeding of the main fermenters is 5% by volume, but owing to the greater vigor of the seed when grown in the presence of bagasse this volume may be reduced by one-half without impairing the rate of fermentation or its final efficiency.

When the fermentation is completed in the main fermenters, which will be found to be shortened by from one-third to one-half owing to the accelerating action of the bagasse, the fermented wort is pumped to the stills as under ordinary conditions, except that a suitable screen is placed over the pipe and the bagasse particles removed from the solution. The residual bagasse may now be washed, and dried and used over and over again, or it may be prepared for utilization in the manufacture of fibre board.

The primary object of my process of fermenting cane bagasse is to remove its residual sugars by the directed formation of substances of economical value, and to thereby prevent their utilization by micro-organisms which impair the quality of the fibre for board manufacture. I found that after the sugars are removed by fermentation, the residual product is still susceptible of deterioration by fungi and other micro-organisms, so it is necessary to add some preservative. The substance used must be very cheap to make it practicable to use it on a commercial scale. Small amounts of acetic acid is a very efficient preservative for this purpose, in fact, the most efficient that could be found. The plan, then, is as follows: The spent bagasse from the main fermenters is coveyed to large vinegar generators and is inoculated with a culture of *B. aceti* by allowing a dilute vinegar solution to percolate through it. The alcohol absorbed by the bagasse is thus oxidized into acetic acid, and the bagasse, if it has developed as little as 0.5% acetic acid, may be stored indefinitely without deterioration. The material can now be dried in suitable driers, or in the sun, and then baled for fibre board manufacture.

I claim:

The process which comprises the mixture of bagasse and a molasses wort, the sterilization of this mixture, the subjection of this mixture to the fermenting action of seed yeast until the yeast cells have become distributed upon the bagasse fibres and the wort has been reduced to one-half of its original density, and the transfer of this fermenting mixture to a body of molasses wort in which it is desired to produce alcoholic fermentation.

WILLIAM L. OWEN.